United States Patent
Sung et al.

(10) Patent No.: US 7,751,842 B2
(45) Date of Patent: Jul. 6, 2010

(54) METHOD AND SYSTEM FOR PROCESSING POC AD-HOC GROUP SESSION INFORMATION USING RTCP CONNECTION MESSAGE

(75) Inventors: Sang-Kyung Sung, Seoul (KR); Wuk Kim, Gwacheon-si (KR); Sung-Jin Park, Suwon-si (KR); Ji-Hye Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 589 days.

(21) Appl. No.: 11/811,651

(22) Filed: Jun. 11, 2007

(65) Prior Publication Data
US 2008/0003999 A1    Jan. 3, 2008

(30) Foreign Application Priority Data
Jun. 9, 2006    (KR) ............... 10-2006-0052226
Aug. 30, 2006    (KR) ............... 10-2006-0082743

(51) Int. Cl.
*H04B 7/00*    (2006.01)
(52) U.S. Cl. .............. 455/518; 455/519; 455/458; 455/456.2
(58) Field of Classification Search .......... 455/518, 455/519, 515, 67.7, 79, 552.1, 553.1, 567, 455/230, 4.2, 412.1, 414.1, 458, 422.1, 550.1, 455/456.2; 709/227
See application file for complete search history.

(56) References Cited

U.S. PATENT DOCUMENTS

| | | | |
|---|---|---|---|
| 2002/0077136 A1* | 6/2002 | Maggenti et al. | 455/518 |
| 2004/0032843 A1 | 2/2004 | Schaefer et al. | |
| 2004/0082352 A1 | 4/2004 | Keating et al. | |
| 2007/0136475 A1* | 6/2007 | Leppisaari et al. | 709/227 |
| 2007/0276947 A1* | 11/2007 | Panattu et al. | 709/227 |
| 2008/0248826 A1* | 10/2008 | Holm | 455/518 |

FOREIGN PATENT DOCUMENTS

| | | |
|---|---|---|
| KR | 1020060014619 | 2/2006 |
| WO | WO 2004028113 | 4/2004 |

\* cited by examiner

*Primary Examiner*—Tan Trinh
(74) *Attorney, Agent, or Firm*—The Farrell Law Firm, LLP (57) ABSTRACT

Disclosed is a method for enabling a receiving-side Push-To-Talk (PTT)-over-Cellular (PoC) user to acquire ad-hoc group invitee information and selectively establishing a PoC session according to preference when a pre-established session and an auto-answer mode have been set between a receiving-side PoC user equipment and a PoC server in a PoC system. Particularly, in order to efficiently utilize the receiving-side Session Initiation Protocol (SIP) session setting, disclosed are a solution for transferring information related to other users expected to participate in group communication through user-plane signaling, and in addition, access rules, service setting, timers and a method for changing a response set between the client and server in order to support the solution.

33 Claims, 8 Drawing Sheets

| V=2 | P | 01111 | PT=APP=204 | length=N |
|---|---|---|---|---|
| SSRC of PoC Server performing the Participating PoC function ||||||
| name = PoC2 ||||||
| SDES item content (Invitee ID) | | | Session type | Add. indic. |
| SDES item<br>URL_A, URL_B, URL_C, URL_X = No. of Anonymous Client ||||||

FIG.7

| V=2 | P | 00111 | PT=APP=204 | length=3 |
|---|---|---|---|---|
| SSRC of PoC Client sending the acknowledgement message ||||
| name = PoC2 ||||
| subtype | reason code (unknown ID) / padding ||||

FIG.8

METHOD AND SYSTEM FOR PROCESSING POC AD-HOC GROUP SESSION INFORMATION USING RTCP CONNECTION MESSAGE

PRIORITY

This application claims the benefit under 35 U.S.C. 119(a) of applications entitled "Method And System For Processing PoC Ad-Hoc Group Session Information Using RTCP Connection Message" filed in the Korean Intellectual Property Office on Jun. 9, 2006 and assigned Serial No. 2006-52226, and filed on Aug. 30, 2006 and assigned Serial No. 2006-82743, respectively, the contents of both of which are incorporated herein by reference.

BACKGROUND OF THE INVENTION

1. Field of the Invention

The present invention relates to a method and system for transferring group invitee information to a receiving-side Push-To-Talk (PTT)-over-Cellular (PoC) client upon establishing an ad-hoc PoC group session in a PoC system.

2. Description of the Related Art

Significant developments in mobile communication technology and the expansion of communication networks have led to the provision of various services and applications which use mobile telephones. In addition to the basic communication service, users are demanding more diversified services, including a positioning, a multimedia and a PTT service. Particularly, the PTT service supports various supplementary functions such as instant messenger and status display, as well as group and voice communication which have been provided by conventional radio transmitters or Trunked Radio Systems (TRSs).

Currently, the industry is working to standardize a PoC service which employs such a PTT function in a mobile communication network. One feature of the PoC service, which draws a distinction between the PoC service and the conventional mobile communication service, is that a user can perform communication while moving between sessions, if necessary, because he/she belongs to a plurality of sessions. The requirements that a user must be able to communicate while moving among a plurality of PoC sessions are specified in the Open Mobile Alliance (OMA) which is an organization regulating pertinent mobile communication services.

According to the PoC 1.0 standard, a PoC session is established in such a manner that media data is transmitted only to PoC clients participating in the PoC session in real time. According to such a rule, users not participating in the PoC session due to battery discharge or absence, for example, cannot receive a media stream, such as voice, transmitted in a one-to-one session or group PoC session. That is, the PoC 1.0 technology does not support a voice mail box function, which has been supported in conventional communication systems.

Meanwhile, the PoC 1.0 standard supports an ad-hoc group session mode which appoints a user list as an object group. In this case, since each receiving-side PoC client cannot receive information about users invited to an ad-hoc group session, there is a problem in that each receiving-side PoC client has to participate in the ad-hoc group session before obtaining information about the invited users. For this reason, a scheme for transferring information about all users invited to an ad-hoc group session as described above, which is required for receiving-side users to determine whether to participate in the session, to the receiving-side users upon inviting the receiving-side users to the session is specified as a requirement in PoC 2.0.

Meanwhile, the PoC 1.0 standard supports a pre-established session and an auto-answer mode so as to simplify a session establishment procedure. When a PoC client and a PoC server, which support both a pre-established session and an auto-answer mode as described above, receive a session invitation message for the ad-hoc group session, the PoC client and PoC server respond immediately without confirmation of each corresponding user by transmitting a session participating success message to a transmitting-side PoC network. This is because, when the PoC server directly transmits a Session Initiation Protocol (SIP) success message as a response, an SIP message exchange procedure between the receiving-side PoC server and PoC client is simplified and thus a session setup time is reduced. However, the pre-established session and auto-answer mode provided in the prior art have disadvantages in that it is impossible to provide a message for transferring group invitee information upon establishing the ad-hoc group session, or to request a receiving-side PoC user to confirm invitee information.

SUMMARY OF THE INVENTION

Accordingly, the present invention has been made to solve the above-mentioned problems occurring in the prior art, and the present invention provides a method and system for transferring invitee information for an ad-hoc group session by using a pre-established session, when a PoC server, having established an auto-answer mode and the pre-established session with a receiving-side PoC client, receives a session invitation message including the invitee information for the ad-hoc group session.

The present invention provides a method and system for identifying whether or not a user will participate in a session regardless of the response mode of a receiving-side PoC client when the receiving-side PoC server transmits corresponding invitee information.

The present invention provides a method and system for signaling to efficiently process an SIP and Real-Time Transport Protocol (RTP) media transmission to a transmitting side when a PoC client accepts or rejects participation in an ad-hoc group session.

In addition, the present invention provides a method and system for implementing the algorithms and functions of a PoC client and a PoC server in a method for transferring invitee information for an ad-hoc group session.

In accordance with the present invention, there is provided a system for processing PoC ad-hoc group session information in a PoC system, in which a pre-established session and an auto-answer mode have been set between a receiving-side PoC client and a receiving-side PoC server, ad-hoc group session invitee information is provided to the receiving-side PoC client upon establishing a PoC ad-hoc group session, and a session setup according to the provided invitee information is performed, the system including the PoC server for creating a connection message including the invitee information and an Auto-Answer Override (AAO) request parameter when a session invitation message including the ad-hoc group invitee information has been received from a transmitting-side network, transferring the created connection message to the receiving-side PoC client, and then performing a PoC session procedure according to a response received from the PoC client, and the PoC client for entering a manual response mode regardless of a currently-set response mode so as to transfer invitee information included in the connection message to a PoC user when the connection message has been received, and transferring a response message including information about acceptance or rejection of participation in the session, which is input from the PoC user, to the PoC server.

In accordance with the present invention, there is provided a method for processing PoC ad-hoc group session information in a PoC system in which a pre-established session and an auto-answer mode have been set between a receiving-side PoC client and a receiving-side PoC server, the method providing ad-hoc group session invitee information to the receiving-side PoC client upon establishing a PoC ad-hoc group session, the method performing a session setup according to the provided invitee information, the method including creating, by the PoC server, a connection message including the invitee information and an AAO request parameter when a session invitation message including the ad-hoc group invitee information has been received from a transmitting-side network, and transferring the created connection message to the receiving-side PoC client, entering, by the PoC client, a manual response mode regardless of a currently-set response mode so as to transfer invitee information included in the connection message to a PoC user when the connection message has been received, transferring, by the PoC client, a response message including information about acceptance or rejection of participation in the session, which is input from the PoC user, to the PoC server, and performing, by the PoC server, a PoC session procedure according to a response received from the PoC client.

According to the present invention, it is possible to selectively include an AAO request parameter in the connection message.

Also, the present invention includes a procedure for improving an ad-hoc PoC group session establishment procedure in the pre-established session and auto answer according to a time point at which a PoC user equipment transmits a user confirmation message.

In accordance with the present invention, in order to provide ad-hoc group session invitee information to the receiving-side PoC client and perform a session setup according to the provided invitee information upon establishing a PoC ad-hoc group session in a PoC system in which a pre-established session and an auto-answer mode have been set between a receiving-side PoC client and a receiving-side PoC server, there is provided a method for processing ad-hoc group invitee information included in a session invite message according to a service setting preset between the receiving-side PoC client and receiving-side PoC server when the receiving-side PoC server receives the session invite message including the ad-hoc group invitee information for a transmitting-side network. That is, the ad-hoc group invitee information processing method includes creating and transferring a connection message including the invitee information to the receiving-side PoC client when the receiving-side PoC client has been set to receive a pre-established service supporting reception of the ad-hoc group invitee information, transferring, by the receiving-side PoC client, invitee information included in the connection message to the PoC user when the receiving-side PoC client receives the connection message, transferring, by the receiving-side PoC client, a response message including information about acceptance or rejection of session participation, which is input by the PoC user, to the PoC server, and performing, by the PoC server, a PoC session procedure according to the response received from the receiving-side PoC client.

The present invention provides a method for transferring invitee information for an ad-hoc group session by using a pre-established session, when the pre-established session and an auto-answer mode have been established between a receiving-side PoC client and a PoC server. In addition, the present invention provides an ad-hoc group session establishment procedure for managing a response mode established by a PoC client, in order to progress a session establishment utilizing user-plane signaling through the pre-established session and reflecting the intention of a receiving-side PoC user.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described with reference to the accompanying drawings. The following description will be given with respect to when the present invention is applied to a PTT system, particularly to a PoC system which provides a PTT service through a cellular mobile communication network. Generally, a PoC system uses an SIP protocol and an SIP extension protocol in order to transfer session participation information for group communication, and uses an Extensible Markup Language (XML) configuration access protocol (XCAP) in order to acquire group information. Also, an RTP/RTCP protocol is used for real-time media transmission and management in an established session, and real-time RTCP-based dedicated protocol called "Talk Burst Control Protocol (TBCP)" is defined and used to manage a floor, which is a feature of PTT service. Particularly, the present invention uses either a TBCP message having the form of an RTCP APP or a newly-established MBCP message, in order to transfer invitee information by using a pre-established session between a PoC server and a UE.

The following embodiment of the present invention may be implemented with the aforementioned protocols, and the basic construction of the present invention is based on the PoC Rel. 1 system and may be described with a PoC Box or an extended conceptual XML Document Management (XDM) server.

First, the following description will be given with respect to a normal PoC system, to which the present invention is applied.

Figure 1:
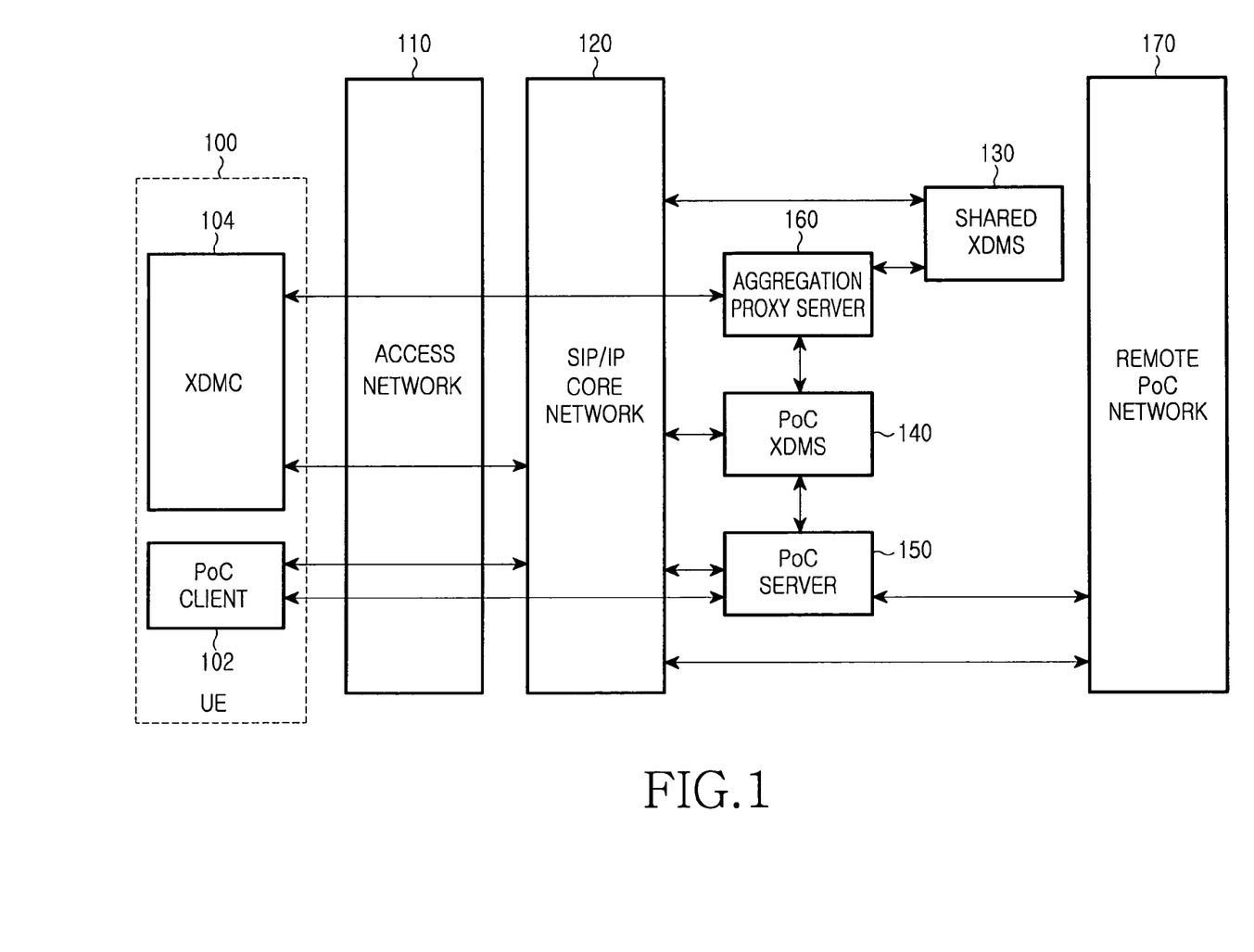
FIG. 1 illustrates the construction of a conventional PoC service system.

FIG. 1 illustrates the construction of a conventional PoC service system and a relative network. The PoC system includes a PoC UE 100, Extensible Markup Language (XML) Document Management Servers (XDMSs) 130 and 140 and a PoC server 150. In addition, the PoC system may further include an aggregation proxy server 160. The aforementioned components may be connected to each other through an access network 110, an SIP/IP core network 120 or a remote PoC network 170.

The PoC UE 100 includes a PoC client 102 and an XML Document Management Client (XDM client) 104.

The PoC client 102, which represents a service requester contained in the PoC UE 100, resides in the PoC UE 100 and performs a network access so as to provide a PoC service subscriber with a PoC service. The PoC service subscriber may be provided with a PoC service through the PoC UE equipped with the PoC client. In the following description, the "PoC client" will be used as the general term for the PoC service subscriber and the UE equipped with a PoC client. Also, the reference numeral of the PoC client will be omitted unless a specific distinction is required.

The PoC client is mainly used to enable a PoC service subscriber (i.e. PoC user) to establish a PoC session, participate in an already established session, or terminate an established session. The PoC client also has the functions for creating and transmitting a talk burst, supporting an instant personal alert, and authenticating an access to a PoC service. The PoC client may be connected to the SIP/IP core network 120, which supports SIP/IP multimedia, through the access network 110.

The PoC client is connected to the SIP/IP core network 120, which importantly supports SIP/IP multimedia services, via the access network 110. The SIP/IP core network 120 is connected to the PoC server 150 and the XDMSs 130 and 140 so as to support the PoC service. In this case, the PoC server 150 can perform a controlling PoC function for maintaining and managing a PoC session, and perform a participating PoC function for participating in a PoC session established for a point-to-point communication or a multipoint communication.

Meanwhile, a PoC service may be accompanied with a group session establishment service, such as a conference communication. To this end, the OMA standard defines the XDMSs 130 and 140 and the XDM client 104 for a group list service. FIG. 1 illustrates a PoC XDMS 140 used for a PoC service and a shared XDMS 130 compatible with other service enablers. Information about a group and a group member may be stored in the XDMSs 130 and 140 through the PoC client. From a list of individuals or groups received from the XDMSs 130 and 140, the PoC client 102 obtains information regarding other PoC clients it can call. Meanwhile, creation, modification, and management of groups and group member information, which are stored in the XDMSs 130 and 140, may be conducted via a communication network, which can be relied on by PoC service providers, such as the Internet or Intranet. The protocols for managing XML documents (e.g. creation, modification and removal of group lists) have no direct relation to the present invention, so a detailed description thereof will be omitted.

For a group service, upon receiving a group list-related request from the XDM client 104, the aggregation proxy server 160 routes the request to the XDMSs 130 and 140 according to proper rules.

The PoC server 150 will now be described.

Figure 2:
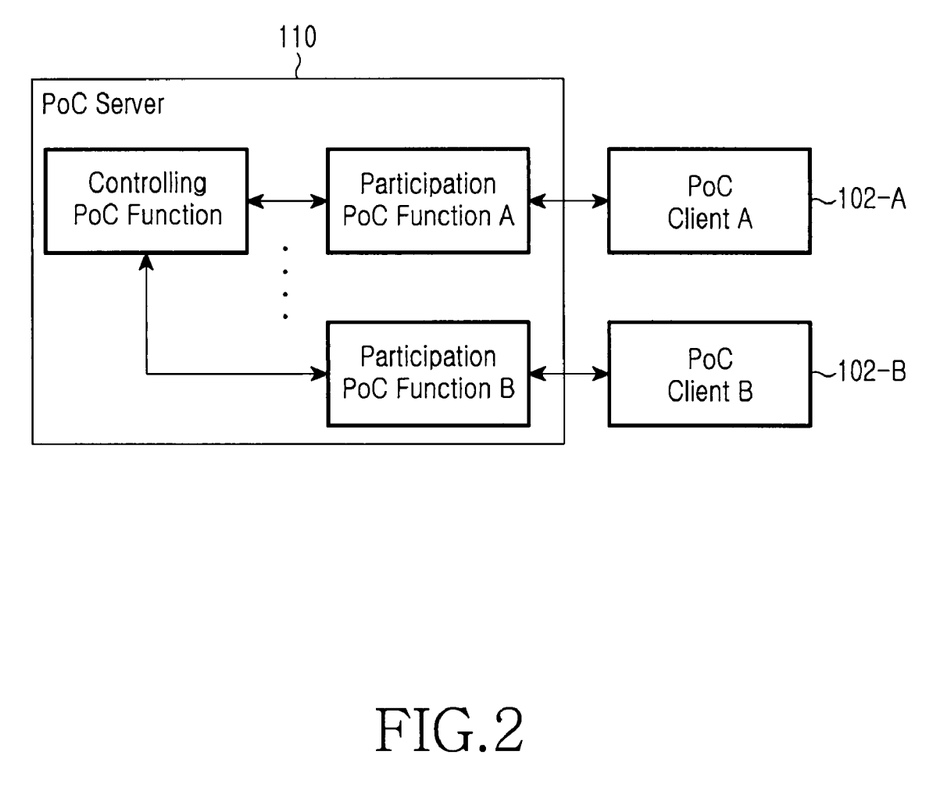
FIG. 2 illustrates the functions of a conventional PoC server.

FIG. 2 illustrates the construction of a conventional PoC server. The functions of the PoC server may be classified into a Controlling PoC Function (CF) for generally maintaining and managing PoC sessions and a Participating PoC Function (PF) for handling maintenance and management for each PoC session. The characteristics according to each function of the PoC server will now be described with reference to Tables 1 and 2.

TABLE 1

Controlling PoC Function (CF)

Provides centralized PoC session handling
Provides the centralized Media distribution
Provides the centralized Talk Burst Arbitration functionality including talker identification
Provides SIP session handling, such as SIP session origination, termination, etc.
Provides policy enforcement for participation in group sessions
Provides the participants information
Collects and provides centralized media quality information
Provides centralized charging reports
May provide transcoding between different codecs
Support Talk Burst Control Protocol Negotiation Among the functions of the PoC server, the CF refers to the overall management of PoC sessions, as shown in Table 1. Particularly, the CF sanctions PoC clients' requests for a floor, decides an order in which to give the clients the floor, and gives the clients the floor in that order. Also, the CF distributes a talk burst from a specific PoC client to the other PoC clients participating in a group PoC call, and provides information about the PoC clients participating in the group PoC call.

As shown in Table 2 below, the PF is related to the management of sessions connected between the CF and each PoC client during a PoC session. Particularly, the PF relays a PoC client's request for the floor, and a grant of a floor to the PoC client by the CF. Also, the PF performs a media relay function between the CF and the PoC client, and a transcoding function when the CF and the PoC client use different codecs In addition, when a talk burst is generated in a session while another talk burst is occurring in simultaneous multiple sessions, the PF performs a filtering function for filtering one of them according to the choice of the user.

TABLE 2

Participating PoC Function (PF)

Provides PoC session handling
May provide the Media relay function between PoC Client and Controlling PoC server
May provide user media adaptation procedures
May provide the Talk Burst control message relay function PoC Client and Controlling PoC server
Provides SIP session handling, such as SIP session origination, termination, etc., on behalf of the represented PoC Client
Provides policy enforcement for incoming PoC session (e.g. access control, incoming PoC session barring, availability status, etc.)
May collect and provide media quality information
Provides the participant charging reports TABLE 2-continued Participating PoC Function (PF)

Figure 3:
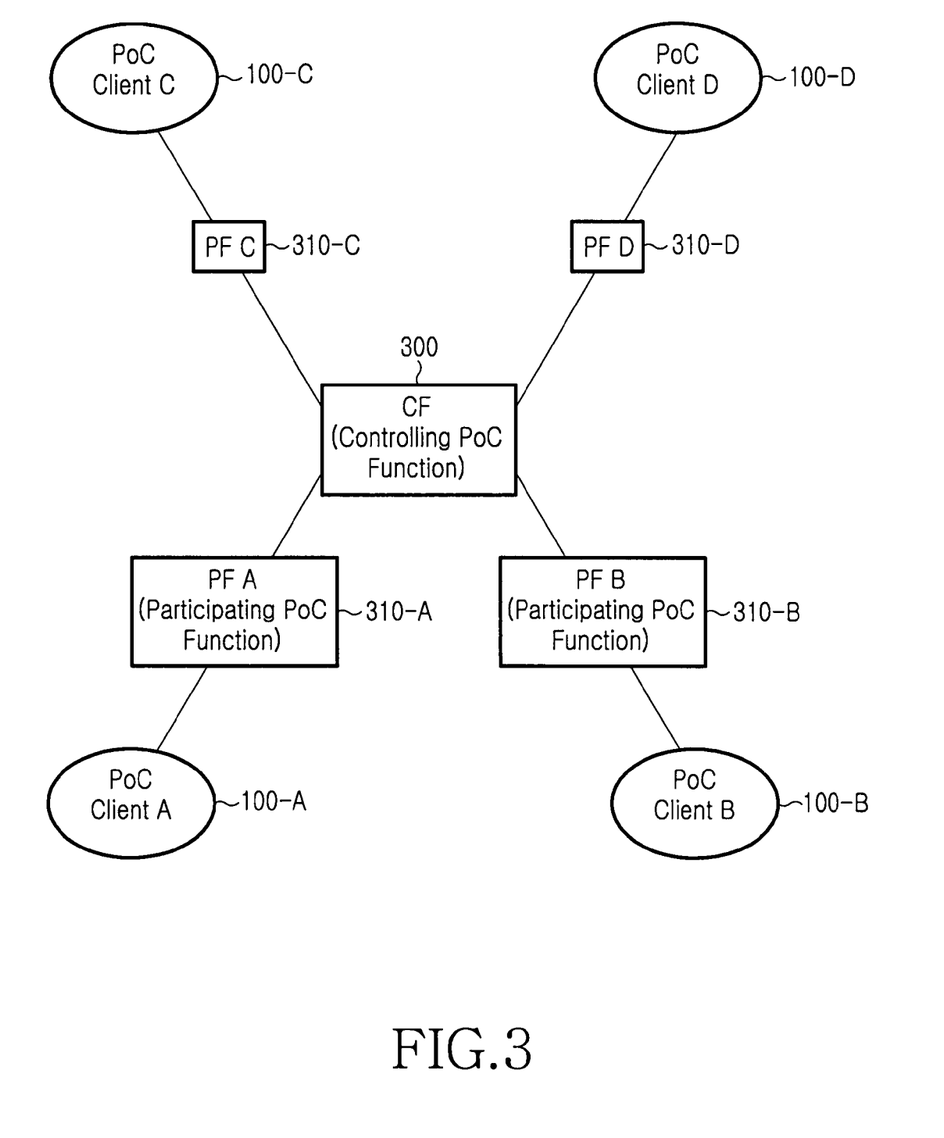
FIG. 3 illustrates the construction of a group session, which includes a Controlling PoC Function unit and a Participating PoC Function unit.

May provide filtering of the media streams in the case of simultaneous sessions
May provide transcoding between different codecs
May support Talk Burst Control Protocol Negotiation
Stores the current Answer Mode and Incoming PoC Session Barring preferences of the PoC Client FIG. 3 illustrates connection of PoC UEs and a PoC server in a group session, in which a CF unit and a PF unit are separately illustrated according to the functions of the PoC server.

PoC clients 100-A to 100-D are connected to a CF 300 through PFs 310-A to 310-D and establish PoC sessions. Thereafter, media corresponding to a corresponding talk burst of a PoC client that has been granted the floor from the CF 300, are sent to the other PoC clients. In this case, the PoC client that has the floor cannot output a talk burst before having checked information regarding PoC clients participating in the group session.

Meanwhile, call processing technology for communication connection in a PoC system may have various procedures depending on requirements and statuses of transmitting and receiving sides. Characteristics of a PoC system required according to the setup of the transmitting and receiving sides, based on the OMA, are as follows:

First, the receiving side can establish its own response mode according to the request of the PoC client, in which the response mode may be classified into an automatic-answer mode and a manual response mode. In the auto-answer mode, when the transmitting side is included in a PoC client list preset by the receiving side, a response is directly sent to the transmitting side by a corresponding network, instead of the receiving side's manual response. This is done since the PoC server has a function to store information regarding the response mode and the corresponding user list in accordance with a response mode setup request of the UE. Meanwhile, the manual response mode is performed when the transmitting side is not included in the auto-answer user list, when it is unclear if the transmitting side is included in the auto-answer user list, or when the receiving side establishes a manual response mode to every user. In the manual response mode, a PoC communication request is transmitted to the UE through the reception network and the call is connected after the PoC client's permission.

Second, the PoC system may have an on-demand session mode and a pre-established session mode according to whether it is to be connected with a PoC server within the home network of the PoC user. In the pre-established session mode, a session is pre-established by the PoC client between the PoC client and the PoC server belonging to the user's home network, according to the request of the PoC client. Such a pre-established session is necessary to negotiate media parameters to be used by a PoC client with the PoC server in advance so that a session can be rapidly established without renegotiation for the media parameters to be later used between the PoC server and the client.

In order to establish a pre-established session, a PoC client employs an SIP INVITE method so as to provide media parameters supported by the PoC client and provided by the server, and a response to the media parameters provided by the server, through a Session Description Protocol Multipurpose Internet Mail Extensions (SDP MIME) body. Upon receiving a response message from the server, the response message is sent together with identification information, e.g., a conference Uniform Resource Identifier (URI), of a newly pre-established session, to the PoC client.

When such a pre-established session is used, it is possible to negotiate in advance an IP address, a port number, a codec to be used and a talk burst control protocol. The on-demand session mode corresponds to when no pre-established session has been established by any PoC client. Thus, the PoC client performs a procedure for connecting a PoC call after receiving an invitation message from another PoC client.

A setup of a response mode for the communication request in the PoC system can be stored in both a PoC server, which is a network element, and the PoC client, which is a UE.

When a response mode is established in a home network managing a PoC client, the response mode is realized in the PoC server having the PF within the home network to which the PoC client belongs.

When the response mode has been established in the network, the PF immediately and automatically responds to another PoC server's request for PoC communication by transmitting a session progress message to the network which has requested communication. Therefore, when the auto-answer mode has been established, the call request procedure is simplified, as compared to when a response is transmitted after the session setup message is transferred to the PoC client, thereby reducing the initial time period required for granting the floor.

However, when the response is automatically performed in the network, a result other than a user's response can occur. Therefore, a response mode can be set up even in the PoC client. In this case, the response mode of the PoC client has a higher priority than the response mode set up on the network. This is performed for the purpose of avoiding a privacy problem occurring when a PoC client modifies its response mode and requests the PoC server to update the response mode, but the response mode is not updated in real time due to signal delay or error in the network.

In summary, although the user's response mode for the PoC service can be set up in both the PoC server and PoC client, a response mode is determined by the PoC client in which the latest user's intention has been reflected, and a stream of media, such as actual user's voice or images, is transferred based on the determination.

A procedure for establishing a PoC multimedia session in the aforementioned PoC system will now be described.

A transmitting-side PoC client makes a request for a call processing by transmitting a multimedia invitation message by means of an SIP protocol. In this case, the multimedia may include audio, video, and texts, which have various formats, according to appointment of a media type. In response to such a call processing request, a receiving-side client performs various response procedures depending on a response mode set up in the corresponding PoC server and on whether a pre-established session has been established. The call processing procedure for PoC communication will now be described by using a single network for both the transmitting and receiving sides.

A transmitting-side PoC client sends an SIP INVITE request including SIP address information of a receiving-side PoC client, with which the transmitting-side PoC client desires to communicate, to a corresponding SIP/IP core network. In this case, an SIP INVITE message may further include elements such as PoC address information of the transmitting-side PoC client, required media parameters and characteristic value information identifying a PoC service. Herein, the "required media parameters" may include a plurality of characteristic values, such as an encoding method regarding audio and video, a rate, and a payload type when the required session is related to multimedia.

The SIP INVITE message is transferred to a participating PoC server via corresponding IMS servers (i.e., a {Proxy Call Server Control Function (P-CSCF) and a Serving-Call Server Control Function (S-CSCF)) in the IP Multimedia Subsystem (IMS) network, based on a path query in a Dynamic Host Configuration Protocol (DHCP) server or a Domain Name Server (DNS). When a normal communication is requested, a participating PoC server, to which a PoC client is connected, can be realized separately from a controlling PoC server managing a talk burst of an established session, so that the SIP INVITE request sent to the PF server is transferred to the CF server via the SIP/IP core network of a corresponding network.

Meanwhile, a PoC session controlling network including a CF transfers an SIP INVITE request message to the receiving-side network, and then receives a response message from the receiving-side network. The SIP message responding from the receiving-side network may be a 1xx provisional response message, a 2xx successful response message, or one of 4XX to 6XX error response messages, depending on setup of the PF and the receiving-side PoC client. In the auto-answer mode, an SIP 183 Session Progress signal may be received as a response message, through which a connection between the PoC server and the client can take place in an IMS network of a communication requester. As a communication permission signal of the reception-side PoC client, an SIP 183 Session Progress or SIP 200 OK response is transmitted to the PoC client via CF and PF PoC servers. Upon receiving the 200 OK response or 183 Session Progress signal from the receiving-side PoC server, the CF confirms that the PoC call has been connected, and transmits a Floor Granted signal to the transmitting-side PoC client so as to grant the floor for a talk burst. The response, i.e., granting the floor for a talk burst according to the SIP 200 OK or 183 Session Progress signal, may be identified by using "confirmed" or "unconfirmed." When the CF receives the "unconfirmed" response, it requires a buffering function.

Meanwhile, after receiving a response signal to the SIP INVITE request signal, the transmitting-side PoC client receives a Floor Granted signal to transfer a talk burst transmission permission signal, e.g., a ring back tone, through an RTCP. The Floor Granted signal is created by the CF having a talk burst mediation right, and transmitted to the PoC client through the PF managing the corresponding PoC client. Since the Floor Granted signal uses a bearer path instead of the SIP protocol, the Floor Granted signal can be transmitted without passing through an SIP/IP core network such as the IMS. The PoC client who confirmed the ring back tone transfers a media, e.g., a stream of voice, using an RTP.

An embodiment of the present invention will be described with reference to the construction of the aforementioned PoC system. PoC client A desires to establish an ad-hoc group session including clients B, C and D. Meanwhile, it is assumed that PoC client B has established a pre-established session with PoC server B, and has established the aforementioned auto-answer mode as a response mode in the PoC server B (i.e., PF B). Under these assumptions, the present invention uses the response mode and pre-established session established between PoC client B and PoC server B, and enables the PoC server to provide PoC identifier information of PoC clients C and D, which are invited clients in the ad-hoc group, to PoC client B. In addition, the present invention provides a method for enabling the user of PoC client B to identify invitee information in a corresponding ad-hoc group session and then to progress a following session establishment procedure.

The flow of signals transmitted/received between PoC servers and PoC clients, in which a PoC server provides ad-hoc group invitee information to a corresponding PoC client and the PoC client having received the ad-hoc group invitee information accepts or rejects the establishment of the session, will be described in detail with reference to FIGS. 4 and 5.

In addition, the present invention provides a procedure using a race condition as an invitee information confirmation message, in which the race condition is a technology for preventing media from being unconditionally transmitted in a response mode discord environment which may occur in the conventional pre-established session and auto-answer mode between a PoC server and a UE. FIG. 4 shows the functions of a receiving-side PoC server and a PoC client and the flow of signals thereof when a session is requested with ad-hoc group invitee information in a transmitting-side PoC network according to an embodiment of the present invention. Herein, it is assumed that PoC client A desires to establish an ad-hoc group session including PoC users A, B, C and D, a pre-established session has been established between PoC server B and PoC client B, and the response mode of PoC server B has been established to an auto-answer mode.

PoC client A transmits an SIP INVITE message including information about PoC user A, B, C and D, who are invitees to the ad-hoc group session, to PoC server A in the home network of PoC client A in step 400. In this case, PoC server A acts even as a Controlling PoC server X according to the characteristics of an ad-hoc group, so that PoC server A may be implemented as one server in terms of physical construction. The present invention will be described when separate Controlling PoC server X is included. The following description will be given about an example in which Controlling PoC server X, having received the INVITE message from PoC client A in step 402, transmits the INVITE message to PoC client B among the invitees of the ad-hoc group session.

In step 404, when receiving-side PoC server B receives the INVITE message including invitee information of a corresponding group, receiving-side PoC server B checks a response mode and a pre-established session, which are established with receiving-side PoC client B, and the identifier information of invited PoC users.

When a pre-established session can be utilized by using a proposed media parameter and a response mode has been established to an auto-answer mode, PoC server B transmits a 200 OK message to PoC client A through steps 406 to 410. Next, receiving-side PoC server B creates an RTCP connection message including information about corresponding invitees in step 412, and then transmits the RTCP connection message into the dialog of the pre-established session in step 416. In step 412, receiving-side PoC server B may insert an Auto-Answer Override (AAO) request parameter, which overrides the established response mode of PoC client B and forces a manual response upon PoC client B, into the RTCP connection message so as to request confirmation of the receiving-side user.

In addition, after transmitting the RTCP connection message, PoC server B may operate timer A, which is for expiration of the RTCP connection message, and hold a floor grant and/or media stream transmission until a successful response message is received from PoC client B (step 414). If an RTCP response message is not received, PoC server B may retransmit the RTCP connection message by operating timer B, which is a timer for re-requesting the connection message, within a range in which time B does not expire. In this case, when PoC server B receives an RTCP response message or the pre-established session is released while timers A and B are being driven, PoC server B ends the driving of the timers. Also, PoC server B holds media transmission within the session until timer B expires.

Meanwhile, PoC client B having received the RTCP connection message, which has been transmitted from PoC server B in step 416, enables a PoC user to check ad-hoc group invitee information included in the RTCP connection message (step 418), determines an acceptance or rejection response input in step 418 by the user, and transmits an RTCP response message in response to the RTCP connection message according to the response of the user.

Figure 4:
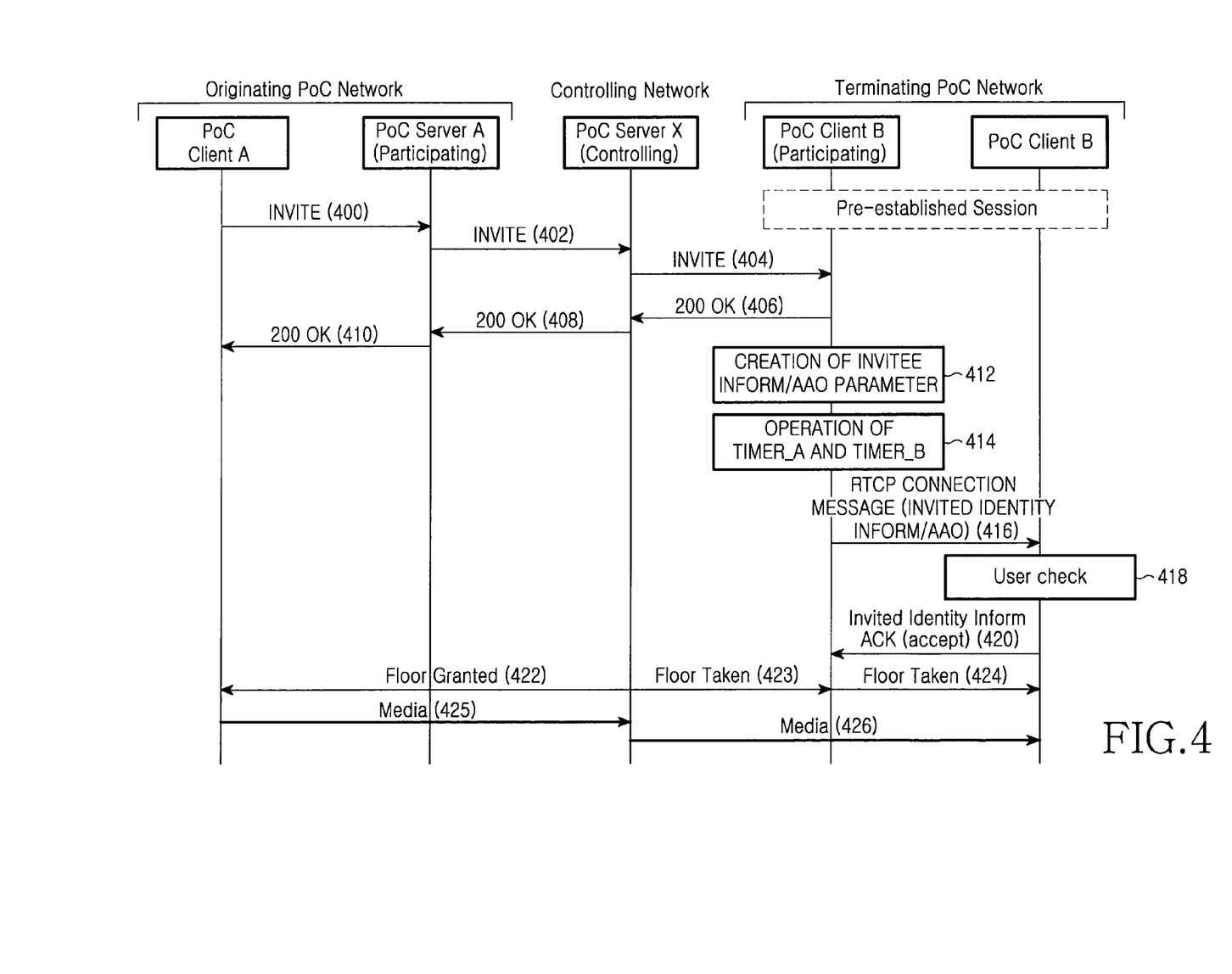
FIG. 4 shows the flow of signals processed according to a session establishment response by a PoC user when ad-hoc group invitee information is transmitted/received to/from a PoC server according to a first embodiment of the present invention.

Meanwhile, the procedure of FIG. 4 illustrates when a PoC user selects acceptance of the session establishment in step 418. Therefore, PoC client B transmits a session acceptance message to PoC server B in step 420, so that a peer-to-peer PoC session is established. PoC client A, having been granted a floor in step 422, transmits real RTP media to PoC client B in steps 425 and 426. Receiving-side PoC client B receives a media stream transmitted from PoC client A, and automatically reproduces or displays the received media stream in real time.

Figure 5:
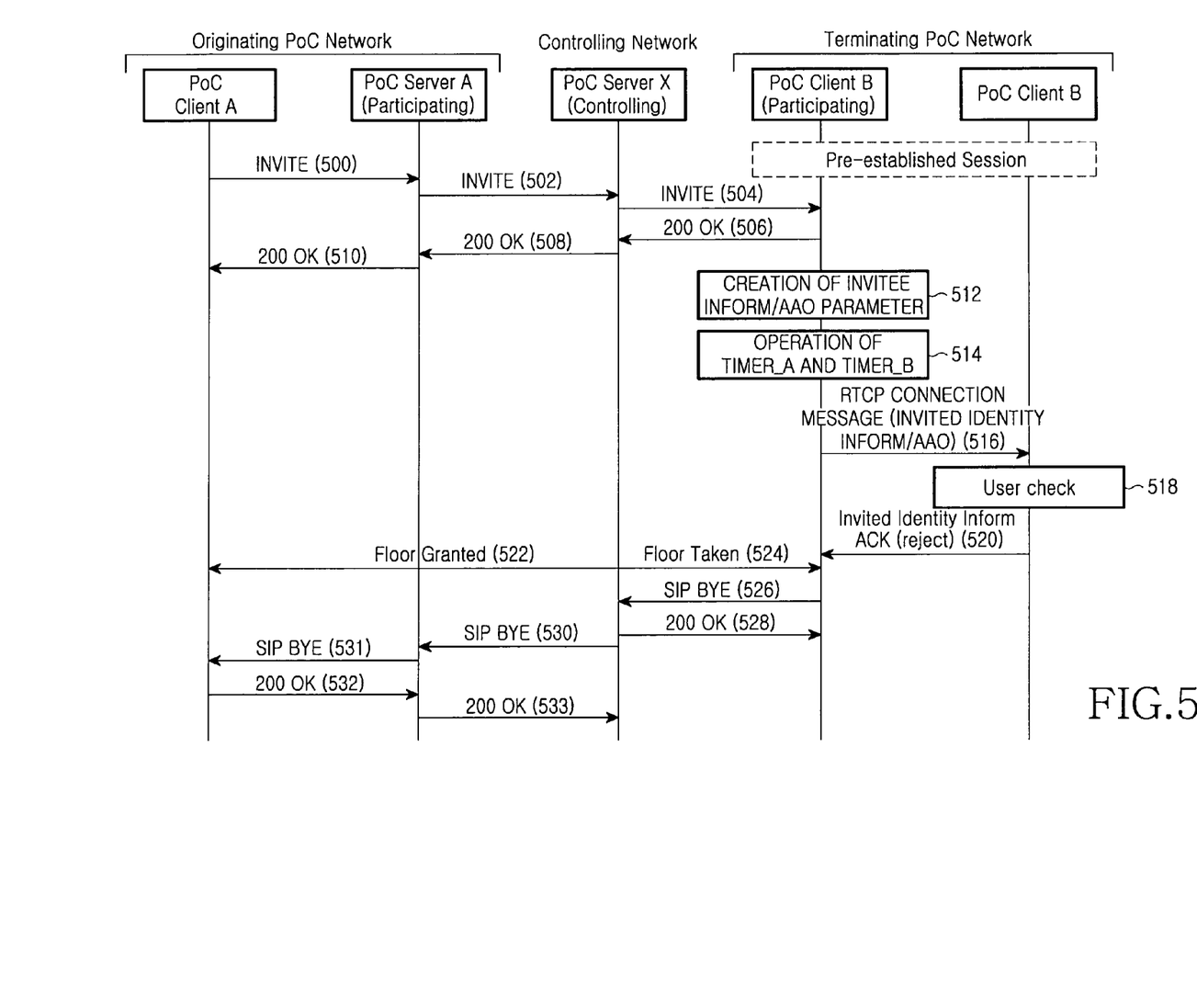
FIG. 5 shows the flow of signals processed according to a session rejection response by a PoC user when ad-hoc group invitee information is transmitted/received to/from a PoC server according to the first embodiment of the present invention.

FIG. 5 shows a session progress procedure when the PoC user, having checked ad-hoc group invitee information through the RTCP connection message received in step 416 of FIG. 4, rejects participation in the corresponding session. Steps 500, 502, 504, 506, 508, 510, 512, 514, 516 and 518 of FIG. 5 are the same as steps 400, 402, 404, 406, 408, 410, 412, 414, 416 and 418 of FIG. 4, respectively. Meanwhile, after step 516, when the PoC user checks ad-hoc group invitee information and then rejects a session connection, PoC client B transmits the RTCP response message including a session rejection parameter to PoC client B. After checking the invitee information, the PoC user may notify others that the PoC user has rejected the session participation. A detailed method for inserting a participation rejection reason code for notifying others that the session participation has been rejected will be described later with reference to FIG. 8.

Meanwhile, according to a session rejection response included in a message transmitted from PoC client B in step 520, PoC server B transmits an SIP BYE message to PoC client A through steps 526, 530 and 531, thereby notifying PoC client A that the session connection has been rejected. That is, the SIP session established through steps 506 to 510 is released from a corresponding ad-hoc group through steps 526 to 532. Also, an RTP media stream transmitted at this time is not transferred to PoC client B due to session release. In this case, server-side timers A and B operate so as to perform the same functions as those of timers A and B of FIG. 4.

Meanwhile, a detailed format and the AAO parameter for expressing invitee information included in the RTCP connection message, described with reference to FIGS. 4 and 5, will be described later with reference to FIGS. 7 and 8. In this case, the AAO parameter is selectively included in the RTCP connection message so as to improve a response procedure of a receiving-side PoC client.

Figure 6:
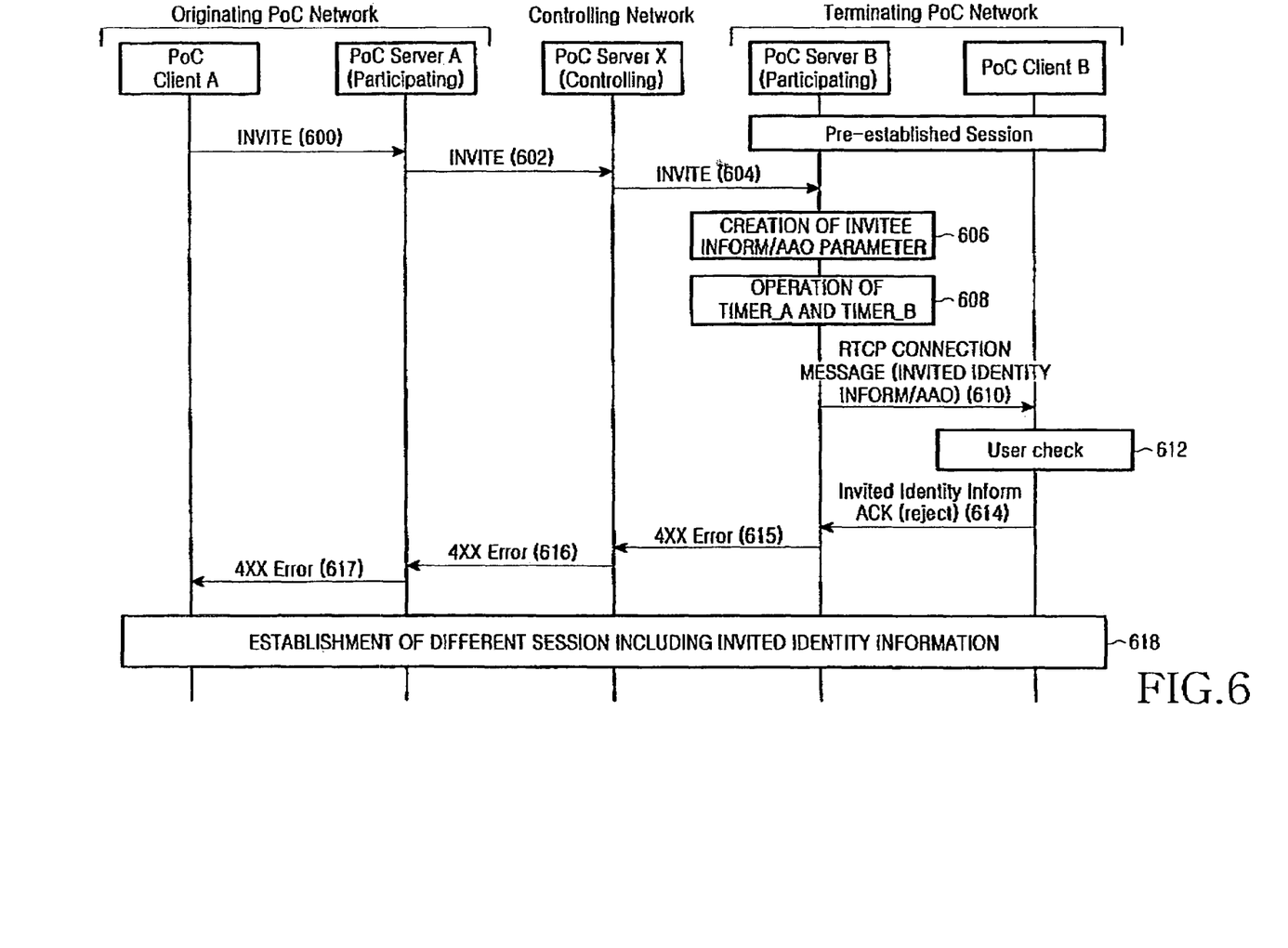
FIG. 6 shows the improved flow of signals processed according to a session rejection response by a PoC user when ad-hoc group invitee information is transmitted/received to/from a PoC server according to a second embodiment of the present invention.

The present invention provides a method for transferring ad-hoc group invitee information using the RTCP connection message and for improving the session establishment procedure by considering a race condition (i.e., a discord in response modes between a UE and a server) using the AAO function, which is illustrated in FIG. 6.

PoC client A transfers an INVITE message including invitee information to PoC server B through steps 600 to 604. Then, PoC server B, having received the INVITE message including invitee information, checks whether or not a pre-established session and a response mode have been established, and creates invitee information and an AAO parameter to be included in an RTCP connection message (step 606). Also, PoC server B drives server-side timers A and B, which perform the same functions as those of timers A and B described with reference to FIGS. 4 and 5, in order to handle RTCP connection and response messages (step 608). Timer A is designed to generate a 4XX error response in addition to the aforementioned function of blocking media streams, when an RTCP response message has not been received in the session progress procedure. Also, timer B operates to retransmit the RTCP connection message when an RTCP response equal to that of FIG. 4 has not been received.

Thereafter, PoC server B transmits an RTCP connection message, into which the invitee information and AAO parameter created in step 606 are inserted, to PoC client B (step 610). Then, PoC client B, having received the RTCP connection message, enables the PoC user to check the invitee information based on the AAO parameter, and then checks a response to a session establishment, which is input by the PoC user (step 612).

When the PoC user determines to reject the establishment of the ad-hoc group session in step 612, PoC client B transmits an RTCP response message including a rejection reason to PoC server B (step 614). Meanwhile, when PoC server B receives the message transmitted in step 614 before timer A expires, or when time A expires before the PoC server B receives the message transmitted in step 614, PoC server B transmits a session error response to the transmitting-side network through step 616. Thereafter, PoC client A may independently perform another session establishment operation including such invitee information as that in step 618.

FIG. 6 shows a procedure for establishing a session in a pre-established session and an auto-answer mode according to the selection of the PoC user after the PoC user checks invitee information.

Meanwhile, PoC server B, having received a session INVITE message in FIGS. 4 to 6, may perform an auto-answer procedure or manual response procedure according to a separate access rule or service setting, which is designed to determine a response mode of the aforementioned message including the ad-hoc group invitee information. An access rule stored in an XDM server may include rule documents regarding whether or not an auto-answer mode is permitted when the session INVITE message including the invitee information is received. In this case, when the invitee information access rule does not permit the auto-answer mode, the PoC server overrides a response mode stored for a corresponding client and adopts the manual response mode. In detail, the invitee information access rule is included as an <action> element in the "PoC User Access Policy." When the <action> element does not permit the auto-answer mode for a session INVITE message including ad-hoc group invitee information, the PoC server overrides an auto-answer mode service setting stored therein, adopts the manual response procedure, and transfers received invitee information by using an SIP message.

Figure 7:
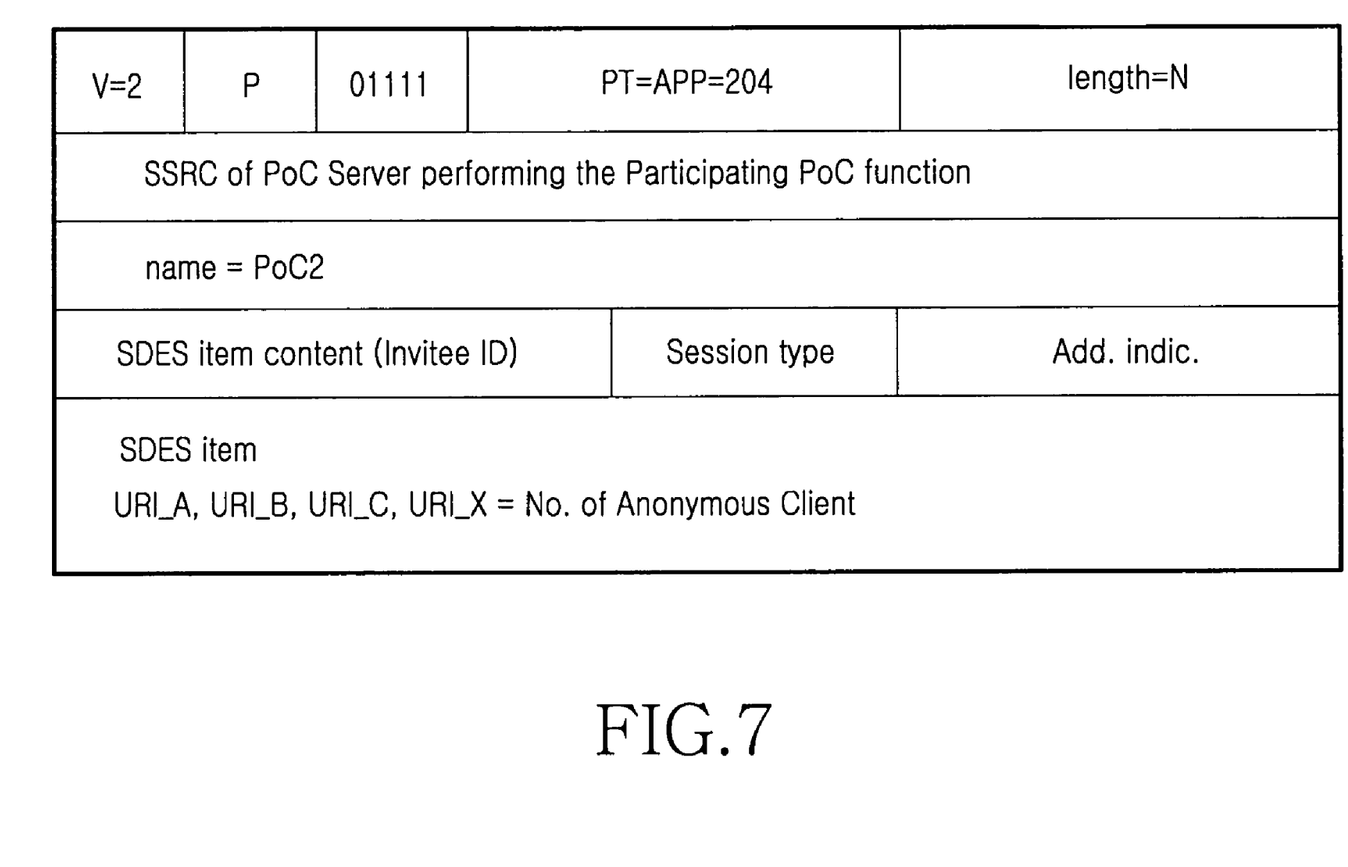
FIG. 7 illustrates the format of a Real-Time Control Protocol (RTCP) connection message transferred between a User Equipment (UE) and the PoC server, which are shown in FIG. 4.

FIG. 7 illustrates the format of the RTCP connection message described with reference to FIGS. 4 to 6 according to the present invention. The RTCP connection message based on the format of a typical RTCP APP message includes binary data such as "SDES item content='XXXXFYYYYYYYYYYY'" in a Source Description (SDES) item content field in order to identify transference of the invitee information. The "XXXX" field may be used to represent that there is Identifier (ID) information of a session initiator, a session or a PoC group for example, which is included in the existing art. The "F" field represents that invitee information of a group session or ad-hoc group session is included in the SDES item field of the RTCP connection message when the "F" field has a value of "1." Also, when the "F" field is set to have a value of "1," as described above, Uniform Resource Identifier (URI) address information of corresponding invitees is included in the SDES item field.

In this case, when corresponding invitee information is included in the SDES item field, URI address information may be set as anonymous as required by a specific PoC user or PoC service operator, and then, the URI address information is not transferred to a receiving-side PoC client. Instead of the URI address information of invitees requested to be anonymous, information about anonymous identities and the number of anonymous requesters may be provided to receiving-side PoC users.

Next, an AAO request parameter may be included in an additional indicator field. That is, when "Add. Indic.='xayyyyyy'" is added in FIG. 7, "a" field having a value of "1" causes the RTCP connection message to operate as a message indicating an "Auto Answer Override (AAO)" operation. When a PoC client receives an RTCP connection message including such a parameter, the PoC client causes the PoC user to respond manually regardless of a preset response mode.

Meanwhile, the scope of the present invention is not limited to the message name, the RTCP connection message may be modified or changed to a user-plane message defined to be based on the format of the RTCP APP. For example, the RTCP connection message may be inserted as an additional field into a Talk Burst (TB) Connect or Media Burst (MB) Connect message as defined in PoC 2.0, or may be presented in the TB Connect or MB Connect message in advance and transferred in a new message form such as an "MBCP Inform" message. It should be clearly understood that the "F" field for reporting that invitee information of an ad-hoc group session is included and/or the "a" field for requesting the user to respond manually may be represented as an Option filed of a different type in the user-plane message.

Figure 8:
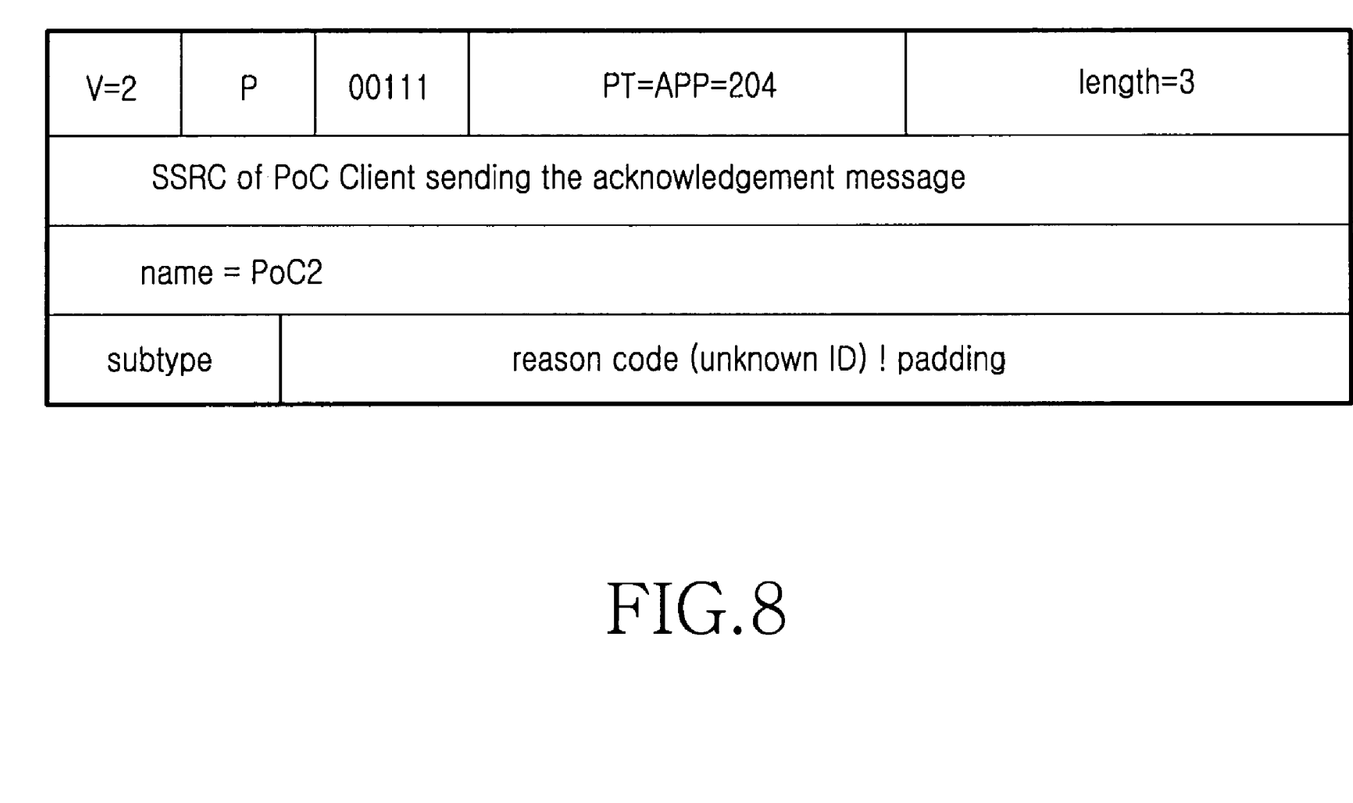
FIG. 8 illustrates the format of an RTCP response (ACK) message transferred between a UE and the PoC server, which are shown in FIG. 4.

FIG. 8 illustrates the format of an RTCP response (ACK) message described with reference to FIGS. 4 to 6 according to the present invention. After invitee information and a manual response request message has been transferred from PoC server B to PoC client B, when the PoC user rejects the session invitation, the PoC client may transmit an RTCP response message including a rejection reason so as to send a "ringing" response to the session invitation to a transmitting-side network, or may transmit an SIP error response including the rejection reason. To this end, a field value representing impossibility of invitee identification is defined in a reason code within the RTCP ACK response message shown in FIG. 8.

In addition, the present invention provides a procedure of processing a connection message between a PoC server and a PoC client, based on a service setting related to ad-hoc group invitee information between the PoC server and PoC client in the basic procedure of FIG. 4. First, PoC client B establishes a service setting of specifying either that PoC client B can receive ad-hoc group invitee information or that PoC client B desires to use invitee information (e.g., Invitee Parties Identity Information Mode active) in PoC server B. In this case, an invitee information service setting may be implemented by using an SIP PUBLISH scheme, and may be implemented by expanding the existing XML schema for service settings. Meanwhile, when the value of an invitee information reception mode among stored service setting values is "true," PoC server B having received an ad-hoc group session invitation message including the invitee information corrects and modifies the invitee information according to the format of an RTCP connection message before transmitting the ad-hoc group session invitation message to a receiving-side PoC client. In contrast, when the value of an invitee information reception mode among the service setting values is "false," PoC server B transmits an RTCP connection message not including relevant invitee information to the receiving-side PoC client.

The present invention provides a method for transferring invitee information for an ad-hoc group session by using an RTCP message transferred through a pre-established session and a method for performing a procedure for either acceptance or rejection of session participation depending on the selection of a receiving-side PoC user, between a PoC UE and a PoC server which have established to use the pre-established session and auto-answer mode. Also, according to the present invention, it is possible to identify session invitee information or the number of anonymous users of the ad-hoc group in the aforementioned scenarios, so that the PoC user can determine whether to participate in the session. In addition, according to the present invention, the PoC system can manage transference of an RTP media stream due to a discord of response modes, while providing rapid establishment of a PoC session.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A system for processing Push-To-Talk (PTT)-over-Cellular (PoC) ad-hoc group session information in a PoC system, in which a pre-established session and an auto-answer mode have been set between a receiving-side PoC client and a receiving-side PoC server, ad-hoc group session invitee information is provided to the receiving-side PoC client upon establishing a PoC ad-hoc group session, and a session setup according to the provided invitee information is performed, the system comprising:

the PoC server for creating a connection message including the invitee information and an Auto-Answer Override (AAO) request parameter when a session invitation message including the ad-hoc group invitee information has been received from a transmitting-side network, transferring the created connection message to the receiving-side PoC client, and then performing a PoC session procedure according to a response received from the PoC client; and the PoC client for entering a manual response mode regardless of a currently-set response mode so as to transfer invitee information included in the connection message to a PoC user when the connection message has been received, and transferring to the PoC server a response message including information about acceptance or rejection of participation in the session, which is input from the PoC user.

2. The system as claimed in claim 1, wherein the PoC server comprises a first timer for indicating connection message expiration to hold a floor or media stream transmission until the PoC server receives a successful response message from the PoC client after transmitting the connection message.

3. The system as claimed in claim 2, wherein the PoC server further comprises a second timer for transmission of a re-request message, in order to retransmit a Real-Time Control Protocol (RTCP) connection message within a range in which the first timer does not expire when the PoC server does not receive the response message.

4. The system as claimed in claim 3, wherein the PoC server ends driving of the first and second timers either when the response message is received or when the pre-established session is released while the first and second timers are being driven.

5. The system as claimed in claim 3, wherein the PoC server further comprises a third timer which holds transmission of a media stream until the PoC server receives a successful response message from the PoC client after transmitting the connection message, and transfers an error response to the transmitting-side network if the response message is not received within a set time period.

6. The system as claimed in claim 5, wherein the PoC server further comprises a fourth timer for transmission of a re-request message, in order to retransmit an RTCP connection message within a range in which the third timer does not expire when the PoC server does not receive the response message.

7. The system as claimed in claim 5, wherein the PoC server transfers an error response message to the transmitting-side network if the PoC server does not receive a response message from the PoC client before the third timer expires after the transmission of the connection message.

8. The system as claimed in claim 1, wherein, when the PoC server receives a session participation acceptance response from the PoC client, the PoC server transfers a media stream transmitted from the transmitting-side network to the PoC client.

9. The system as claimed in claim 5, wherein the PoC server releases the established session when receiving a session participation rejection response from the PoC client.

10. The system as claimed in claim 8, wherein, with respect to URI address information of invitees requested to be anonymous by a specific PoC user or PoC service operator, the PoC server inserts a number of anonymous requesters into a field including the URI address information about invitees of the ad-hoc group session.

11. The system as claimed in claim 1, wherein, when the PoC server receives a session invitation message including ad-hoc group invitee information from the transmitting-side network, the PoC server checks a response mode set between the PoC client and the PoC server, and establishes a session by transmitting a response message to the session invitation message received from the transmitting-side network when the response mode has been set to the auto-answer mode.

12. The system as claimed in claim 1, wherein the connection message further includes:
- a field for identifying transference of the invitee information;
- a field for including Uniform Resource Identifier (URI) address information about an invitee of an ad-hoc group session; and
- a field including an Auto-Answer Override (AAO) request parameter for instructing a change of operation into a manual response mode regardless of a preset response mode.

13. The system as claimed in claim 1, wherein the connection message refers to a media floor management protocol message.

14. The system as claimed in claim 1, wherein the PoC client inserts a rejection reason into the response message before transmitting the response message.

15. A method for processing Push-To-Talk (PTT)-over-Cellular (PoC) ad-hoc group session information in a PoC system in which a pre-established session and an auto-answer mode have been set between a receiving-side PoC client and a receiving-side PoC server, the method providing ad-hoc group session invitee information to the receiving-side PoC client upon establishing a PoC ad-hoc group session, the method performing a session setup according to the provided invitee information, the method comprising the steps of:
- creating, by the PoC server, a connection message including the invitee information and an Auto-Answer Override (AAO) request parameter when a session invitation message including the ad-hoc group invitee information has been received from a transmitting-side network, and transferring the created connection message to the receiving-side PoC client;
- entering, by the PoC client, a manual response mode regardless of a currently-set response mode so as to transfer invitee information included in the connection message to a PoC user when the connection message has been received;
- transferring, by the PoC client, a response message including information about acceptance or rejection of participation in the session, which is input from the PoC user, to the PoC server; and
- performing, by the PoC server, a PoC session procedure according to a response received from the PoC client.

16. The method as claimed in claim 15, further comprising holding, by the PoC server, a floor or media stream transmission until the PoC server receives a successful response message from the PoC client, by driving a first timer for indicating connection message expiration after transmission of the connection message.

17. The method as claimed in claim 16, further comprising driving, by the PoC server, a second timer for transmission of a re-request message, in order to retransmit Real-Time Control Protocol (RTCP) connection message within a range in which the first timer does not expire, when the PoC server does not receive the response message.

18. The method as claimed in claim 17, further comprising ending, by the PoC server, driving of the first and second timers either when the response message is received or when the pre-established session is released while the first and second timers are being driven.

19. The method as claimed in claim 17, further comprising holding, by the PoC server, transmission of a media stream until the PoC server receives a successful response message from the PoC client after transmission of the connection message, and transferring an error response to the transmitting-side network if the response message is not received within a set time period by driving a third timer.

20. The method as claimed in claim 19, further comprising driving, by the PoC server, a fourth timer for transmission of a re-request message, in order to retransmit an RTCP connection message within a range in which the third timer does not expire when the PoC server does not receive the response message.

21. The method as claimed in claim 19, further comprising transferring, by the PoC server, an error response message to the transmitting-side network if the PoC server does not receive a response message from the PoC client before the third timer expires after the transmission of the connection message.

22. The method as claimed in claim 15, further comprising transferring, by the PoC server, a media stream transmitted from the transmitting-side network to the PoC client, when the PoC server receives a session participation acceptance response from the PoC client.

23. The method as claimed in claim 22, further comprising releasing, by the PoC server, the established session when a session participation rejection response is received from the PoC client.

24. The method as claimed in claim 15, further comprising the steps of:
checking, by the PoC server, a response mode set between the PoC client and the PoC server, when the PoC server receives a session invitation message including ad-hoc group invitee information from the transmitting-side network; and
establishing, by the PoC server, a session by transmitting a response message to the session invitation message received from the transmitting-side network, when it is determined that the response mode has been set to the auto-answer mode as a result of the checking.

25. The method as claimed in claim 15, wherein the PoC client inserts a rejection reason into the response message before transmitting the response message.

26. A system for processing Push-To-Talk (PTT)-over-Cellular (PoC) ad-hoc group session information in a PoC system, in which a pre-established session and an auto-answer mode have been set between a receiving-side PoC client and a receiving-side PoC server, ad-hoc group session invitee information is provided to the receiving-side PoC client upon establishing a PoC ad-hoc group session, and a session setup according to the provided invitee information is performed, the system comprising:
an Extensible Markup Language Document Management (XDM) server including an invitee information access rule document regarding whether the auto-answer mode of the receiving-side PoC client is permitted; and
a PoC server for checking an invitee information access rule corresponding to the receiving-side PoC client through the XDM server when the PoC server has received a session invitation message from the transmitting-side network, and then overriding a response mode stored for the receiving-side PoC client and transferring received invitee information to the receiving-side PoC client using a Session Initiation Protocol (SIP) message based on a manual response procedure when the invitee information access rule does not permit the auto-answer mode.

27. A method for processing Push-To-Talk (PTT)-over-Cellular (PoC) ad-hoc group session information, in which a pre-established session and an auto-answer mode have been set between a receiving-side PoC client and a receiving-side PoC server, ad-hoc group session invitee information is provided to the receiving-side PoC client upon establishing a PoC ad-hoc group session, and a session setup according to the provided invitee information is performed, the method comprising the steps of:
checking, by the PoC server, an invitee information access rule corresponding to the receiving-side PoC client through the Extensible Markup Language Document Management (XDM) server when the PoC server has received a session invitation message from the transmitting-side network; and
overriding, by the PoC server, a response mode stored for the receiving-side PoC client and transferring received invitee information to the receiving-side PoC client using a Session Initiation Protocol (SIP) message based on a manual response procedure, when the invitee information access rule does not permit the auto-answer mode.

28. A system for processing Push-To-Talk (PTT)-over-Cellular (PoC) ad-hoc group session information in a PoC system, in which a pre-established session and an auto-answer mode have been set between a receiving-side PoC client and a receiving-side PoC server, ad-hoc group session invitee information is provided to the receiving-side PoC client upon establishing a PoC ad-hoc group session, and a session setup according to the provided invitee information is performed, the system comprising:
the receiving-side PoC client for requesting the PoC server to establish a service setting specifying whether the receiving-side PoC client can receive ad-hoc group invitee information; and
the PoC server for establishing the service setting specifying whether the receiving-side PoC client can receive ad-hoc group invitee information, as requested by the receiving-side PoC client, checking the service setting specifying whether the corresponding receiving-side PoC client can receive ad-hoc group invitee information when the PoC server receives a session invitation message including ad-hoc group invitee information from the transmitting-side network, and creating and transmitting a connection message including the invitee information to the receiving-side PoC client when the service setting has been established that the receiving-side PoC client can receive ad-hoc group invitee information.

29. The system as claimed in claim 28, wherein, as a result of receiving the session invitation message and then checking the service setting specifying whether the receiving-side PoC client can receive the ad-hoc group invitee information, when the service setting has been established that the receiving-side PoC client cannot receive the ad-hoc group invitee information, the PoC server creates and transfers a connection message including no invitee information to the receiving-side PoC client.

30. The system as claimed in claim 28, wherein the receiving-side PoC client uses a Session Initiation Protocol (SIP) PUBLISH scheme upon requesting the PoC server to establish the service setting about the invitee information.

31. A method for processing Push-To-Talk (PTT)-over-Cellular (PoC) ad-hoc group session information in a PoC system in which a pre-established session and an auto-answer mode have been set between a receiving-side PoC client and a receiving-side PoC server, the method providing ad-hoc group session invitee information to the receiving-side PoC client upon establishing a PoC ad-hoc group session, the method performing a session setup according to the provided invitee information, the method comprising the steps of:
requesting, by the receiving-side PoC client, the PoC server to establish a service setting specifying whether the receiving-side PoC client can receive ad-hoc group invitee information; and
establishing, by the PoC server, the service setting specifying whether the receiving-side PoC client can receive ad-hoc group invitee information, as requested by the receiving-side PoC client;
checking, by the PoC server, the service setting specifying whether the corresponding receiving-side PoC client can receive ad-hoc group invitee information when the PoC server receives a session invitation message including ad-hoc group invitee information from the transmitting-side network; and creating and transmitting, by the PoC server, a connection message including the invitee information to the receiving-side PoC client when the service setting has been established that the receiving-side PoC client can receive the ad-hoc group invitee information.

32. The method as claimed in claim 31, further comprising creating and transferring, by the PoC server, a connection message including no invitee information to the receiving-side PoC client, when the service setting has been established that the receiving-side PoC client cannot receive the ad-hoc group invitee information.

33. The method as claimed in claim 31, wherein the receiving-side PoC client uses a Session Initiation Protocol (SIP) PUBLISH scheme upon requesting the PoC server to establish the service setting about the invitee information.

\* \* \* \* \*